(12) United States Patent
Guo

(10) Patent No.: US 7,210,232 B2
(45) Date of Patent: May 1, 2007

(54) SAW BLADE CLAMPING MECHANISM FOR A POWER TOOL

(75) Inventor: Dung-Chin Guo, Taichung County (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 0 days.

(21) Appl. No.: 11/293,092

(22) Filed: Dec. 5, 2005

(65) Prior Publication Data

US 2006/0266183 A1  Nov. 30, 2006

(30) Foreign Application Priority Data

May 12, 2005  (TW) .............................. 94207680 U

(51) Int. Cl.
    *B27B 11/06* (2006.01)
(52) U.S. Cl. ...................... 30/392; 83/699.21
(58) Field of Classification Search .................. 83/697, 83/698.11, 699.21; 30/392–394; 279/30, 279/71, 74–75, 82, 87
    See application file for complete search history.

(56) References Cited

U.S. PATENT DOCUMENTS 5,324,052 A * 6/1994 Ortmann ...................... 279/83
5,443,276 A * 8/1995 Nasser et al. .................. 279/77
5,458,346 A * 10/1995 Briggs .......................... 279/97
5,839,196 A * 11/1998 Trott ............................ 30/339
5,848,474 A * 12/1998 Fortney et al. ............... 30/392
6,009,627 A * 1/2000 Dassoulas et al. ............ 30/392
6,260,281 B1   7/2001 Okumura et al.
6,851,194 B1   2/2005 Chen et al.
2004/0194324 A1  10/2004 Youn-Chyuan

FOREIGN PATENT DOCUMENTS

EP            1 437 189 A1     7/2004

* cited by examiner

*Primary Examiner*—Kenneth E. Peterson
*Assistant Examiner*—Phong Nguyen
(74) *Attorney, Agent, or Firm*—Bacon & Thomas, PLLC

(57) ABSTRACT

A saw blade clamping mechanism includes a holder connectable to a reciprocating shaft of a power sawing tool. The holder has a sliding way, a receiving slot for insertion of a saw blade, and a through hole in communication between the sliding way and the receiving slot. A steel ball is movably installed in the through hole. A sliding block is mounted in the sliding way and moveable between a first position for receiving the steel ball for removal of the saw blade out of the receiving slot and a second position to force the steel ball into the receiving slot to lock the saw blade. A spring member supports the sliding block in the second position. A control knob is connected to the sliding block for operation by the user to move the sliding block from the second position to the first position.

3 Claims, 5 Drawing Sheets

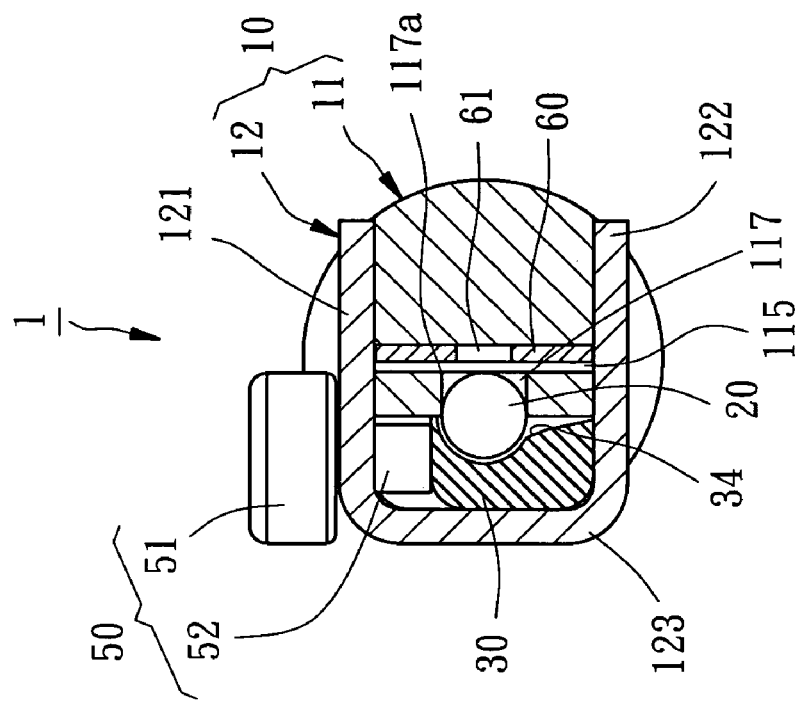
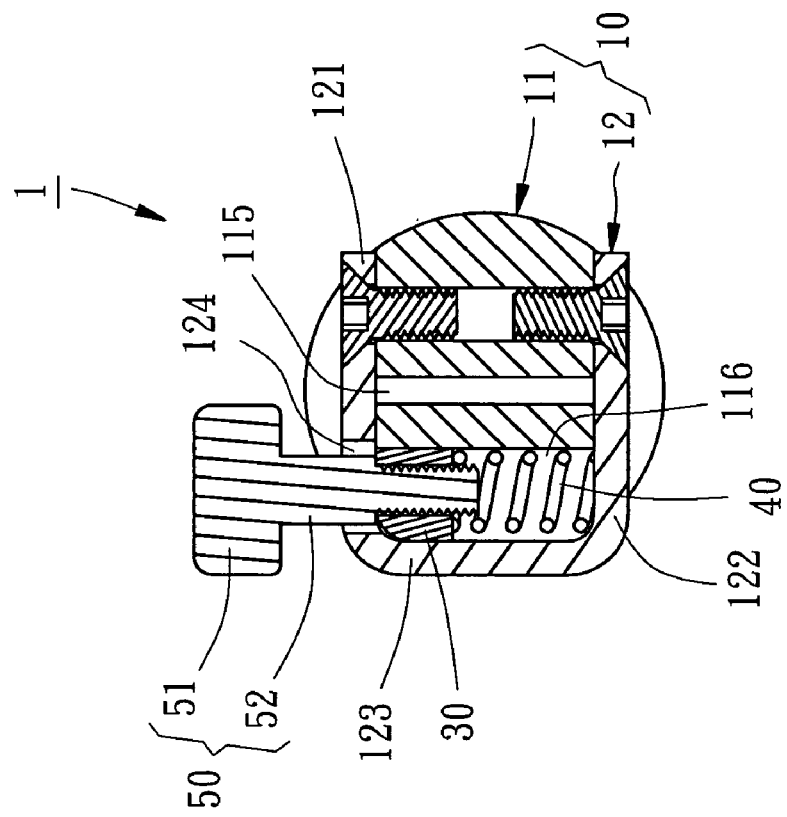

SAW BLADE CLAMPING MECHANISM FOR A POWER TOOL

BACKGROUND OF THE INVENTION

1. Field of the Invention

The present invention relates to a power sawing tool having a reciprocating shaft connected to a saw blade, and more specifically to a saw blade clamping mechanism for the power sawing tool.

2. Description of the Related Art

The saw blade clamping mechanism, which is so-called saw blade connector, for a sawing tool is adapted to secure a saw blade to a reciprocating shaft for allowing the saw blade to be reciprocated by the reciprocating shaft. During cutting working, the saw blade may break, and the operator must detach the broken saw blade from the sawing tool for a replacement. Therefore, it is important to design a saw blade clamping mechanism, which allows quick replacement of the saw blade.

U.S. Pat. No. 6,009,627 discloses a saw blade clamping arrangement for a power tool. According to this design, the saw blade clamping arrangement comprises a biasing member interconnected with the drive shaft and operative for providing a biasing force to retain the saw blade in operative connection with the drive shaft, and an actuation member selectively moveable between a first position and a second position. The first position permits the biasing force of the biasing member to retain the operating connection between the saw blade and the drive shaft. The second position causes the actuation member to overcome the biasing force, thereby permitting removal of the saw blade from the drive shaft. This design of saw blade clamping arrangement is functional. However, because this arrangement uses a number of complicated parts, the installation procedure is complicated, and the manufacturing cost is high. Further, the complicated parts may fail easily during working of the power tool.

SUMMARY OF THE INVENTION

The present invention has been accomplished under the circumstances in view. It is therefore an object of the present invention to provide a saw blade clamping mechanism for a power sawing tool, which allows quick mounting or dismounting of the saw blade.

It is another object of the present invention to provide a saw blade clamping mechanism for a power sawing tool, which has a simple structure and is inexpensive to manufacture.

To achieve these objects of the present invention, the saw blade clamping mechanism comprises a holder connectable to a reciprocating shaft of a power sawing tool. The holder is formed of a holder block and a limiter defined with the holder block a sliding way. The holder block has a receiving slot for insertion of a saw blade, and a through hole in communication between the sliding way and the receiving slot. A steel ball is movably installed in the through hole. A sliding block is mounted in the sliding way and moveable between a first position for receiving the steel ball for removal of the saw blade out of the receiving slot and a second position to force the steel ball into the receiving slot to lock the saw blade. A spring member supports the sliding block in the second position. A control knob is connected to the sliding block for operation by the user to move the sliding block from the second position to the first position.

BRIEF DESCRIPTION OF THE DRAWINGS

FIG. 5 is a sectional view taken along line 5—5 of FIG. 3.

FIG. 6 is similar to FIG. 4 but showing the sliding block moved to the first position.

DETAILED DESCRIPTION OF THE INVENTION

Figure 1:
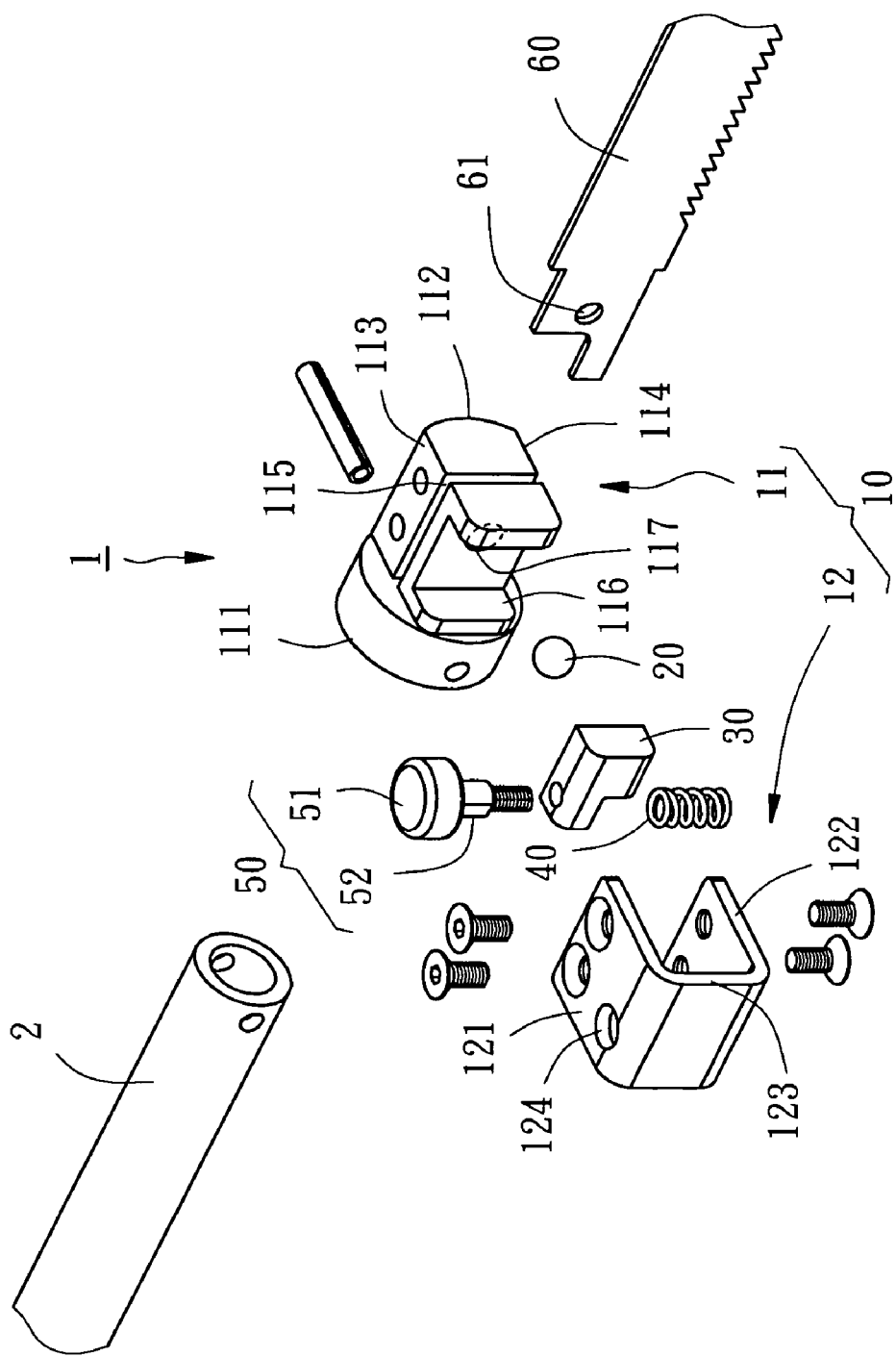
FIG. 1 is an exploded view of a saw blade clamping mechanism according to a preferred embodiment of the present invention.
Figure 2:
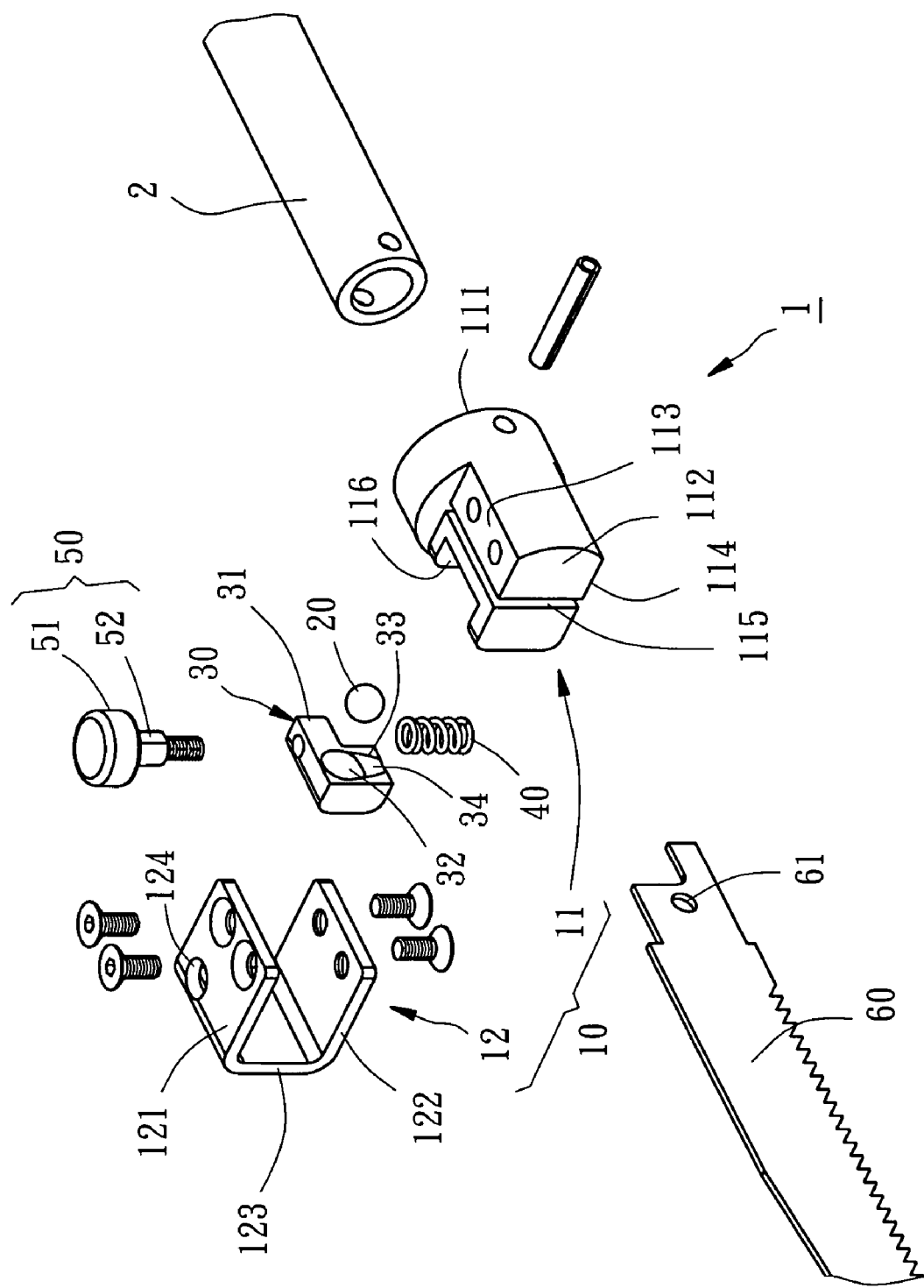
FIG. 2 corresponds to FIG. 1 when viewed from another angle.

Referring to FIGS. 1–5, a saw blade clamping mechanism 1 in accordance with a preferred embodiment of the present invention is shown comprising a holder 10, a ball 20, a sliding block 30, a spring member 40, and a control knob 50.

The holder 10 comprises a holder block 11 and a limiter 12. The holder block 11 is connectable to a drive shaft 2, having a first end 111 for connection to the drive shaft 2, a second end 112, a first lateral side 113, a second lateral side 114 disposed in parallel and opposite to the first lateral side 113, a receiving slot 115, which extends from the second end 112 toward the first end 111 in a predetermined length and cuts through the first lateral side 113 and the second lateral side 114, i.e. the receiving slot 115 has three openings disposed respectively at the first and second lateral sides 113, 114 and the second end 112, a sliding way 116 cut through the first lateral side 113 and the second lateral side 114 at one side, and a through hole 117 extending through the receiving slot 115 and the sliding way 116. The through hole 117 has a first orifice 117a at one sidewall of the receiving slot 115, and a second orifice 117b at the bottom wall of the sliding way 116. The limiter 12 comprises a first side panel 121, a second side panel 122, and a connecting panel 123 connected between one end of the first side panel 121 and one end of the second side panel 122. The first side panel 121 and second side panel 122 of the limiter 12 are respectively joined to the first lateral side 113 and second lateral side 114 of the holder block 11 by screws to close the openings of the sliding way 116 and receiving slot 115 at first lateral side 113 and the second lateral side 114 of the holder block 11. Further, the first side panel 121 has a through hole 124.

The ball 20 is a steel ball inserted into the through hole 117, having a diameter greater than the length of the through hole 117.

The sliding block 30 is movably mounted in the sliding way 116 of the holder block 11, having a contact face 31 disposed in contact with the bottom wall of the sliding way 116 to guide movement of the sliding block 30 in the sliding way 116 between a first position and a second position, a constraint hole 32, a groove 33 formed in the contact face 31 corresponding to the second orifice 117b of the through hole 117, and an actuating surface 34 extending from the bottom side of the constraint hole 32 and sloping gradually outwards. When moving the sliding block 30 in the sliding way 116 from the first position to the second position, the actuating surface 34 forces the ball 20 in the through hole 117 toward the receiving slot 115.

The spring member 40 according to this embodiment is a compression spring supported between the sliding block 30 and the limiter 12 to keep the sliding block 30 in the second position.

The control knob 50 according to this embodiment is shaped like a bolt, having a head 51 and a shank 52. The shank 52 is inserted through the through hole 124 of the first side panel 121 of the limiter 12 into the sliding way 116 of the holder block 11 and connected to the sliding block 30. The user can press the head 51 of the control knob 50 to move the sliding block 30 from the second position to the first position.

Figure 4:
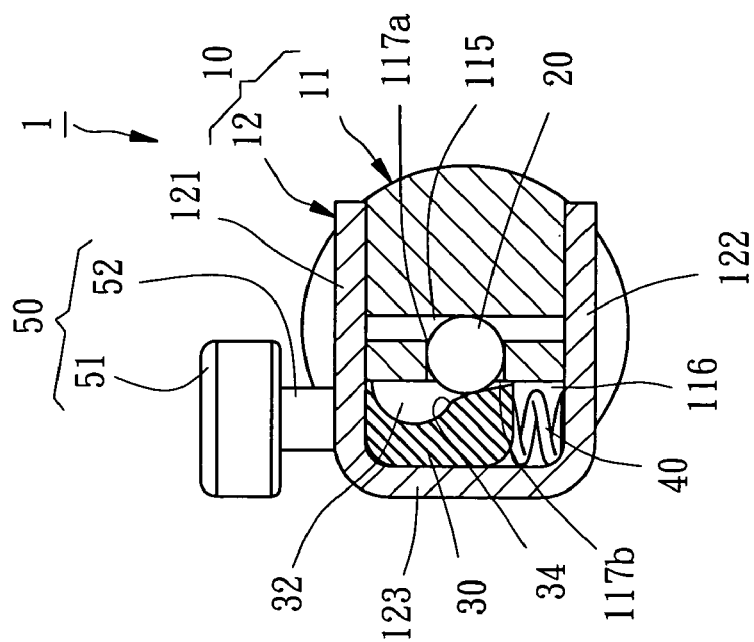
FIG. 4 is a sectional view taken along line 4—4 of FIG. 3.
Figure 3:
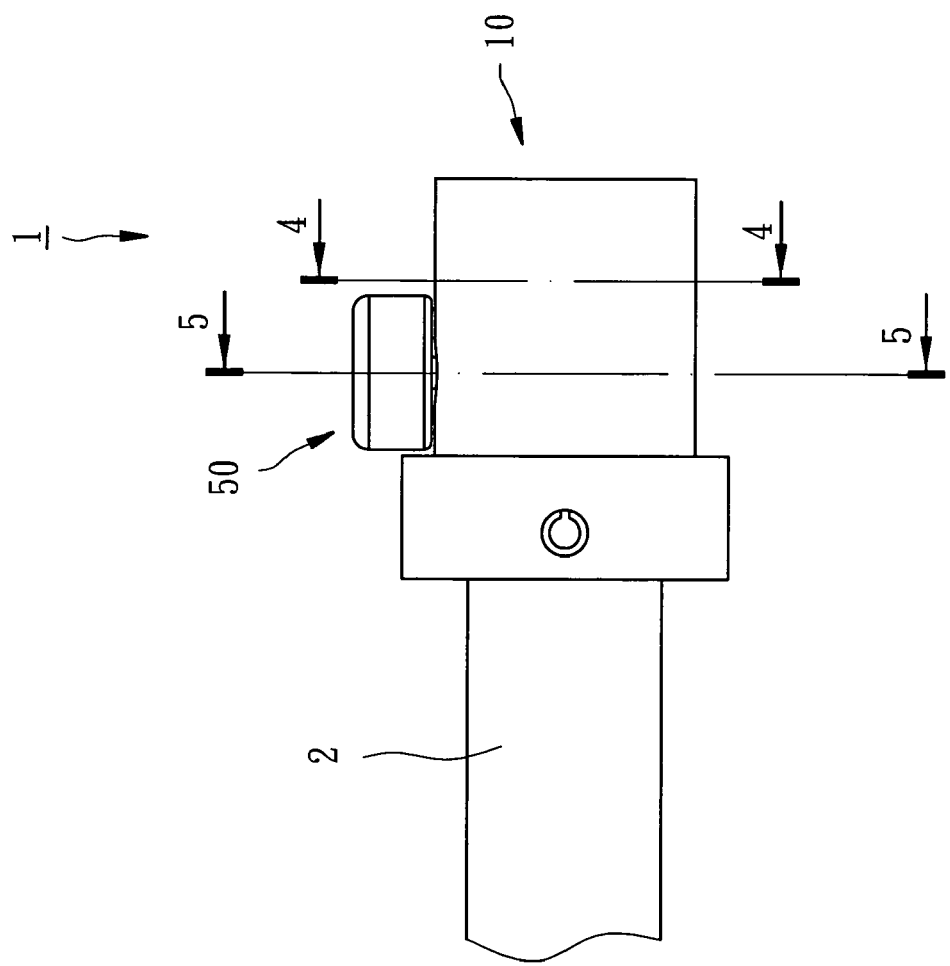
FIG. 3 is a plane assembly view of the saw blade clamping mechanism shown in FIG. 1.
Figure 7:
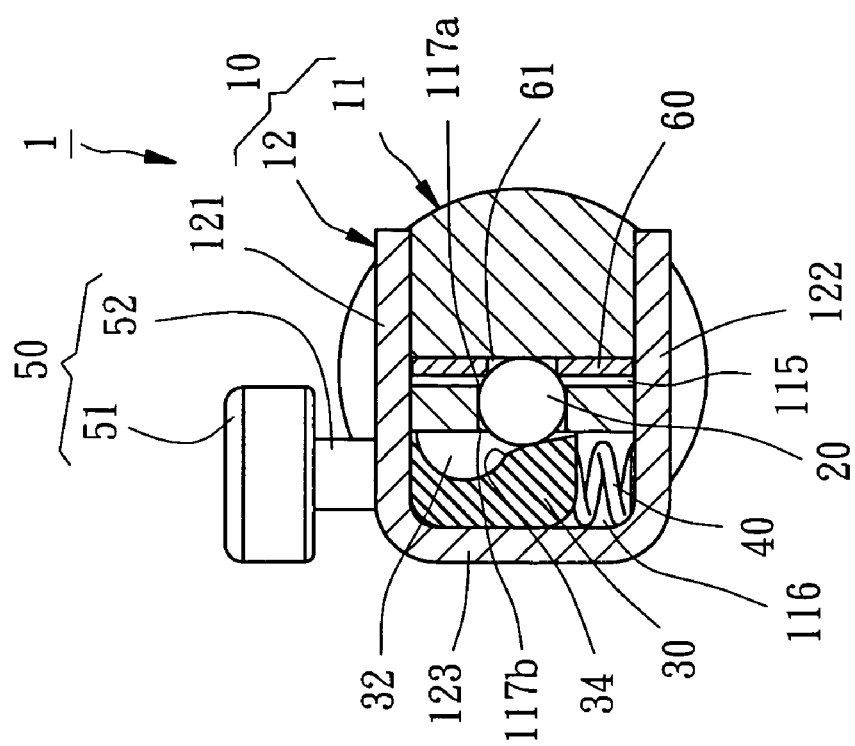
FIG. 7 is similar to FIG. 5 but showing the sliding block moved to the first position.
Figure 8:
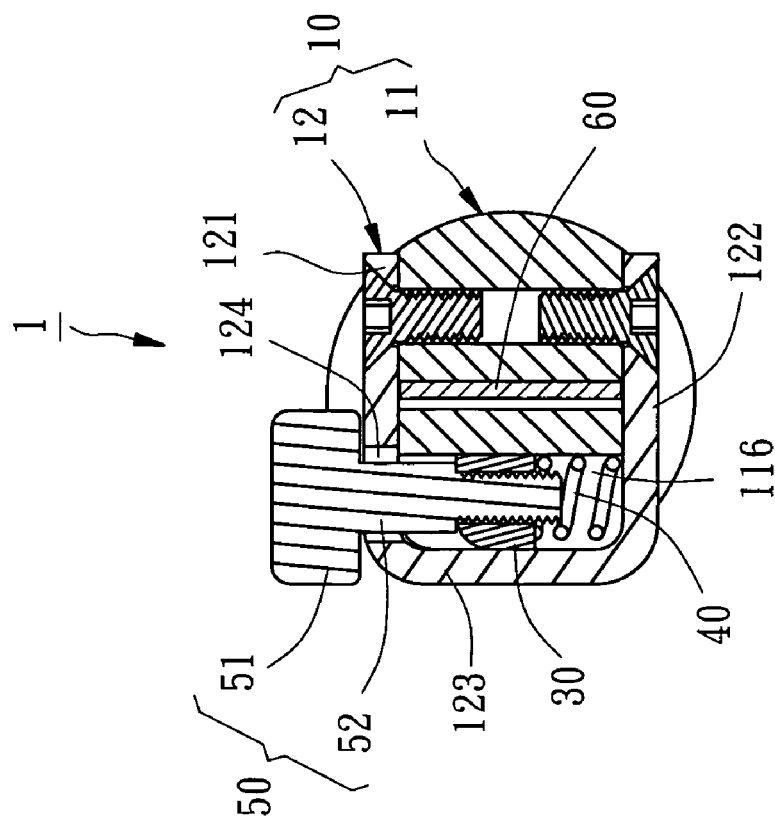
FIG. 8 is sectional view of the saw blade clamping mechanism after installation of the saw blade according to the present invention.

Referring to FIGS. 3–8, normally, the spring member 40 supports the sliding block 30 in the second position. At this time, the shallow portion of the actuating surface 34 faces the second orifice 117b of the through hole 117, and the steel ball 20 is forced by the actuating surface 34 to protrude over the first orifice 117a of the through hole 117 and to stop against one sidewall of the receiving slot 115 as shown in FIGS. 4 and 5. When wishing to install a saw blade 60, press the head 51 of the control knob 50 to move the sliding block 30 from the second position to the first position to have the deep portion of the actuating surface 34 face the second orifice 117b of the through hole 117. At this time, the user can insert the saw blade 60 into the receiving slot 115 to force the steel ball 20 into engagement with the constraint hole 32 of the sliding block 30 as shown in FIGS. 6 and 7. After insertion of the saw blade 60 into the receiving slot 115 of the holder block 11, release the hand from the control knob 50, allowing the spring member 40 to force the sliding block 30 back to the second position, and therefore the actuating surface 34 forces the steel ball 20 to partially protrude over the first orifice 117a of the through hole 117 into a locating hole 61 at one end of the saw blade 60 and to stop against one sidewall of the receiving slot 115, and therefore the saw blade 60 is locked to the holder block 11 of the saw blade clamping mechanism 1.

As indicated above, the saw blade clamping mechanism 1 allows the user to conveniently and rapidly mount or dismount the saw blade 60. Because the saw blade clamping mechanism 1 is comprised of a limited number of simple parts, the assembly process of the saw blade clamping mechanism 1 is simple, and the manufacturing cost of the saw blade clamping mechanism 1 is low. Further, the holder block 11 can easily be processed to provide the sliding way 116 and the receiving slot 115. When the holder block 11 and the limiter 12 are assembled to form the holder 10, the control knob 50 can be inserted through the through hole 124 of the limiter 12 and fastened to the sliding block 30 through, for example, a screw joint.

What is claimed is:

1. A saw blade clamping mechanism for a power sawing tool having a reciprocating shaft, comprising:

a holder having a holder block and a limiter, said holder block having a first end connectable to the reciprocating shaft of the power sawing tool, a second end, a first lateral side, a second lateral side disposed in parallel and opposite to said first lateral side, a receiving slot having openings disposed respectively at said first lateral side, said second lateral side and said second end, a sliding way cut through said first lateral side and said second lateral side at one side, and a through hole in communication between said receiving slot and said sliding way, the through hole of said holder block having a first orifice at a sidewall of said receiving slot and a second orifice at a bottom wall of said sliding way, said limiter having a first side panel fastened to said first lateral side of said holder block and blocking a part of said sliding way and the opening of said receiving slot at said first lateral side, a second side panel fastened to said second lateral side of said holder block and blocking a part of said sliding way and the opening of said receiving slot at said second lateral side, and a connecting panel connected between said first side panel and said second side panel, said first side panel having a through hole;

a ball inserted into the through hole of said holder block, said ball having a diameter greater than the length of the through hole of said holder block;

a sliding block movably mounted in the sliding way of said holder block and having a contact face disposed in contact with the bottom wall of said sliding way to guide movement of said sliding block in said sliding way between a first position and a second position, a constraint hole, a groove formed in said contact face corresponding to the second orifice of the through hole of said holder block, and an actuating surface extending from a bottom side of said constraint hole and sloping gradually outwards, said actuating surface being adapted to force said ball in the through hole of said holder block toward said receiving slot when said sliding block is moved in said sliding way from said first position to said second position;

a spring member supported between said sliding block and said limiter to keep said sliding block in said second position; and a control knob having a head disposed outside said holder, and a shank extending from said head and inserted through the through hole of said limiter and connected to said sliding block for moving said sliding block from said second position to said first position when said head is pressed.

2. The saw blade clamping mechanism as claimed in claim 1, wherein said ball is a steel ball.

3. The saw blade clamping mechanism as claimed in claim 1, wherein said spring member is a coil spring.

* * * * *